(12) United States Patent
Beaver (10) Patent No.: US 11,418,015 B2
(45) Date of Patent: Aug. 16, 2022

(54) ISOLATING GAS-INSULATED BUS ARRANGEMENTS FOR SWITCHGEAR

(71) Applicant: Eaton Intelligent Power Limited, Dublin (IE)

(72) Inventor: Jon Christopher Beaver, Asheville, NC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/009,482

(22) Filed: Jun. 15, 2018

(65) Prior Publication Data

US 2018/0366925 A1    Dec. 20, 2018

Related U.S. Application Data

(60) Provisional application No. 62/520,883, filed on Jun. 16, 2017.

(51) Int. Cl.
*H02B 13/035* (2006.01)
*H02B 13/055* (2006.01)
*H02B 1/20* (2006.01)
*H02B 13/00* (2006.01)
*H02B 13/045* (2006.01)

(52) U.S. Cl.
CPC .......... *H02B 13/0358* (2013.01); *H02B 1/20* (2013.01); *H02B 13/005* (2013.01); *H02B 13/035* (2013.01); *H02B 13/045* (2013.01); *H02B 13/055* (2013.01)

(58) Field of Classification Search
CPC .... H02B 13/0358; H02B 1/20; H02B 13/055; H02B 13/005; H02B 13/035; H02B 13/045

USPC .................................................. 361/612, 614
See application file for complete search history.

(56) References Cited

U.S. PATENT DOCUMENTS

| 4,146,915 A | 3/1979 | Yosida |
| 4,354,220 A * | 10/1982 | Oishi ................. H02B 13/0352 200/301 |
| 5,003,427 A * | 3/1991 | Reichl ..................... H02B 1/22 361/612 |

(Continued)

FOREIGN PATENT DOCUMENTS

| CN | 201708405 | 1/2011 |
| DE | 7232011 | 11/1972 |

(Continued)

OTHER PUBLICATIONS

DE 102007045486, Machine English Translation (Year: 2005).*

(Continued)

*Primary Examiner* — Anatoly Vortman
(74) *Attorney, Agent, or Firm* — Stanek Lemon Crouse & Meeks, P.A.

(57) ABSTRACT

A switchgear assembly includes a plurality of switches arranged in a row and a plurality of gas insulated bus assemblies arranged in a row parallel to the row of switches. The bus assemblies have gas containment enclosures with respective bus sections therein electrically connected to one another by first connectors outside of the gas containment enclosures and electrically connected to respective ones of the switches by second connectors outside of the gas containment enclosures.

3 Claims, 10 Drawing Sheets

(56) References Cited

U.S. PATENT DOCUMENTS

| | | | |
|---|---|---|---|
| 5,045,968 A * | 9/1991 | Suzuyama | H02B 5/06 361/604 |
| 5,521,567 A | 5/1996 | Devonald, III et al. | |
| 6,362,445 B1 | 3/2002 | Marchand et al. | |
| 6,433,271 B1 * | 8/2002 | Arnborg | H02B 13/005 174/16.2 |
| 6,518,531 B2 | 2/2003 | Arioka | |
| 7,417,846 B2 | 8/2008 | Arioka | |
| 7,450,368 B2 | 11/2008 | Parker | |
| 8,045,322 B2 | 10/2011 | Kurogi | |
| 8,629,367 B2 | 1/2014 | Zwicky | |
| 8,717,742 B2 | 5/2014 | Kim | |
| 8,791,379 B2 | 7/2014 | Kikukawa | |
| 8,916,059 B2 | 12/2014 | Glasmacher | |
| 9,620,937 B1 * | 4/2017 | Johnson | H02B 1/565 |
| 9,906,008 B2 | 2/2018 | Yoshida | |
| 2001/0006856 A1 * | 7/2001 | Starck | H02B 13/005 439/278 |
| 2005/0219804 A1 | 10/2005 | Arioka | |
| 2009/0020507 A1 * | 1/2009 | Kurogi | H01H 33/6606 218/119 |
| 2013/0050905 A1 | 2/2013 | Kim | |
| 2018/0166866 A1 | 6/2018 | Lu | |
| 2018/0366924 A1 * | 12/2018 | Yanniello | H02B 13/0358 |

FOREIGN PATENT DOCUMENTS

| | | | |
|---|---|---|---|
| DE | 19518126 | | 11/1996 |
| DE | 10219299 | | 2/2004 |
| DE | 102007045486 | | 5/2008 |
| DE | 102007063478 | | 2/2009 |
| EP | 0199891 A2 * | | 11/1986 ........... H02B 13/005 |
| EP | 0563535 | | 10/1993 |
| FR | 1362997 | | 6/1964 |
| FR | 2555830 A1 | | 5/1985 |
| JP | 0476108 U | | 7/1992 |
| JP | 05304704 | | 11/1993 |
| JP | 06311614 A | | 11/1994 |
| JP | 07123541 A | | 5/1995 |
| JP | 10191514 | | 7/1998 |
| WO | WO 91/00633 | | 1/1991 |
| WO | WO 96/18225 | | 6/1996 |
| WO | WO 01/50563 | | 7/2001 |
| WO | WO 03/081738 | | 10/2003 |
| WO | WO 2013021678 | | 2/2013 |
| WO | WO 2016/092659 | | 6/2016 |

OTHER PUBLICATIONS

DE 7232011U to Brown, Boweri & CIE, Nov. 23, 1972, English Machine Translation (Year: 1972).*
"Cubicle Type Gas Insulated Switchgear: HMGS," Hyundai Heavy Industries Co., Ltd., 2 pages, Downloaded from the Internet at: www.hyundai-elec.com, Jul. 6, 2017.
"GV3 (Single Bus) and GV3D (Double Bus) Gas Insulated Switchgear," TAMCO Switchgear (Malaysia) SDN BHD, Publication 1 GV3/GB3D—Ed 2011, 2 pages.
"Medium voltage switchgear for Substation Solutions, cpg.0 y cpg.1, Families of single and double busbar GIS-type cubicles, up to 40.5 kV," Ormazabal velatia, Downloaded from the Internet at: www.ormazabal.com, Jul. 6, 2017.
"MV Switchgear for Substation Solutions, CPG.0 & CPG.1, Single and double busbar panel type GIS system," Ormazabal velatia, Downloaded from the Internet at: www.ormazabal.com, Jul. 6, 2017.
"ZX2.2 Medium voltage gas-insulated switchgear," ABB, Inc., 1VAL 1001-DB Rev. C, May 2010, 20 pages.
"ZX2.2 Medium voltage switchgear, Increase safety and dependability," ABB, Inc., 1VAL 109901-FL Rev. C, Apr. 2010, 2 pages.
Aufermann et al., "New gas-insulated switchgear for all medium voltage applications," English translation of German publication in the journal "etz 18/2001 p. 20-22."
Fink et al., "New Gas Insulated Switchgear (GIS) for All Medium Voltage Applications," International Power Distribution Congress Cidel Argentina 2002, pp. 1-5.
Notification of Transmittal of the International Search Report and the Written Opinion of the International Searching Authority or the Declaration; PCT/US2018/037762; dated Aug. 28, 2018; 12 pages.
Notification of Transmittal of the International Search Report and the Written Opinion of the International Searching Authority or the Declaration; PCT/US2018/037746; dated Aug. 28, 2018; 13 pages.
Notification of Transmittal of the International Search Report and the Written Opinion of the International Searching Authority, or the Declaration, PCT/US2018/030835, dated Jul. 10, 2018, 12 pages.
Notification of Transmittal of the International Search Report and the Written Opinion of the International Searching Authority, or the Declaration, PCT/US2018/037746.
International Preliminary Report on Patentability, PCT/US2018/037762; dated Dec. 26, 2019; 8 pages.
International Preliminary Report on Patentability, PCT/US2018/037746; dated Dec. 26, 2019; 9 pages.

* cited by examiner

ISOLATING GAS-INSULATED BUS ARRANGEMENTS FOR SWITCHGEAR

CROSS-REFERENCE TO RELATED APPLICATIONS

The present application claims priority to U.S. Provisional Patent Application No. 62/520,883, filed Jun. 16, 2017, entitled ISOLATING GAS-INSULATED BUS ARRANGEMENTS FOR SWITCHGEAR, the content of which is herein incorporated herein by reference in its entirety.

BACKGROUND

The inventive subject matter relates to electrical apparatus and, more particularly, to switchgear.

In typical gas-insulated switchgear (GIS), certain components that are prone to arc generation are placed in closed structures filled with an insulating high-dielectric gas, such as sulfur hexafluoride ($SF_6$). The insulation properties of the gas allow reduced spacing between components and thus enable relatively compact arrangement of the switchgear components. While high-voltage (e.g., 50 kV and above) switchgear is commonly gas-insulated, medium-voltage circuit breakers and other medium-voltage devices may also utilize gas insulated switching components to provide compact form factors for particular industrial and other applications.

SUMMARY

Some embodiments of the inventive subject matter provide a switchgear assembly including a plurality of switches arranged in a row and a plurality of gas insulated bus assemblies arranged in a row parallel to the row of switches. The bus assemblies have gas containment enclosures with respective conductive bus sections therein electrically connected to one another by first connectors outside of the gas containment enclosures and electrically connected to respective ones of the switches by second connectors outside of the gas containment enclosures.

In some embodiments, the gas containment enclosures may have tubular portions that contain the bus sections and are arranged end to end. The first connectors may be positioned at ends of the tubular portions of the enclosure. The gas containment enclosures may each have first and second end faces perpendicular to a longitudinal axis of the tubular portions and the bus sections may extend parallel to the longitudinal axis. The first connectors may be disposed at the end faces.

In further embodiments, the plurality of switches may include first and second parallel rows of switches. The plurality of gas insulated bus assemblies may include first and second parallel rows of gas insulated bus assemblies providing respective first and second phases. Respective ones of the first and second rows of bus assemblies may be electrically connected to respective ones of the first and second rows of switches. Gas containment enclosures of the bus assemblies of the first and second rows of gas insulated bus assemblies may each contain a single bus section.

According to further embodiments, each of the gas containment enclosures may include a plurality of compartments with respective bus sections contained therein. Walls between the compartments may be insulated or grounded. Adjacent ones of the compartments may be separated by first and second metal walls with an insulating material disposed therebetween. The bus sections in the respective compartments may provide respective different phases.

Some embodiments provide a gas insulated bus assembly including a gas containment enclosure and at least one conductive bus section within the gas containment enclosure. First connectors are electrically connected to respective first and second ends of the bus section and are configured to connect outside of the gas containment enclosure to connectors at ends of respective adjacent gas insulated bus assemblies in a row of gas insulated bus assemblies. A second connector is configured connect outside of the gas containment enclosure to a connector for a switch.

In some embodiments, the gas containment enclosure may have a tubular portion having first and second end faces perpendicular to a longitudinal axis of the tubular portion. The at least one bus section may be disposed in the tubular portion and extend parallel to the longitudinal axis to connect to the first connectors, which may be disposed at respective ones of the first and second end faces. In further embodiments, the gas containment enclosure may have a plurality of compartments defined therein, and the at least one bus section may include a plurality of bus sections, respective ones of which are contained in respective ones of the compartments.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As used herein and in keeping with terminology commonly used in the electrical switchgear industry, "gas-insulated" refers to insulation using a relatively high dielectric gas (e.g., a pure gas or gas mixture, which may be pressurized) that has a controlled composition or pressurized air that provides enhanced insulation with respect to, for example, air with an uncontrolled composition at atmospheric pressure. The insulation gas used in a gas-insulated switchgear component may include, for example, a high-dielectric halogenated gas, such as sulfur hexafluoride ($SF_6$) and/or alternatives thereto, such as fluorinated gas (e.g., fluoroketone-based) mixtures. It will be appreciated that the composition of such an insulation gas may be maintained, for example, by containment of the insulation gas within a sealed compartment and/or control of the gas composition using an active control system.

Medium voltage switchgear units typically include three-phase bus structures that interconnect multiple switchgear units. Some of the most devastating faults that can occur in such medium voltage switchgear arrangements are phase-to-phase faults, which can occur where bus sections for different phases run in relatively close proximity to one another, such as where buses extend to interconnect multiple units. Some embodiments of the inventive subject matter provide bus enclosure arrangements for switchgear in which bus sections are disposed in bus enclosures that can provide enhance isolation between phases and reduce the likelihood of phase-to-phase faults.

Figure 1:
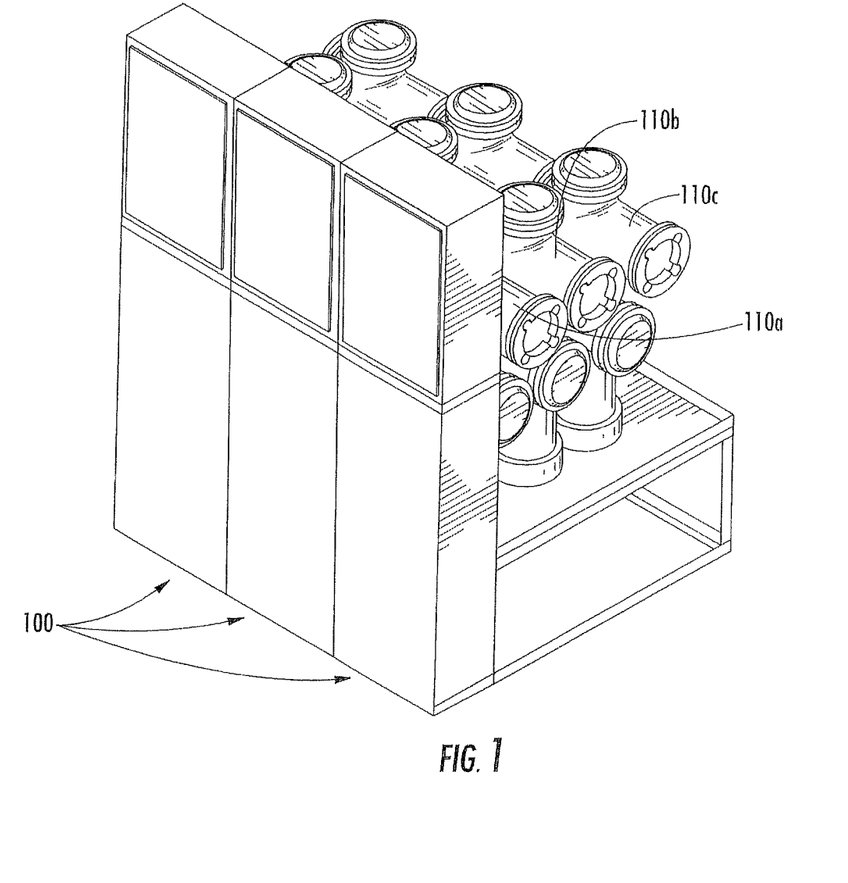
FIG. 1 is a perspective view of a switchgear arrangement according to some embodiments.
Figure 2:
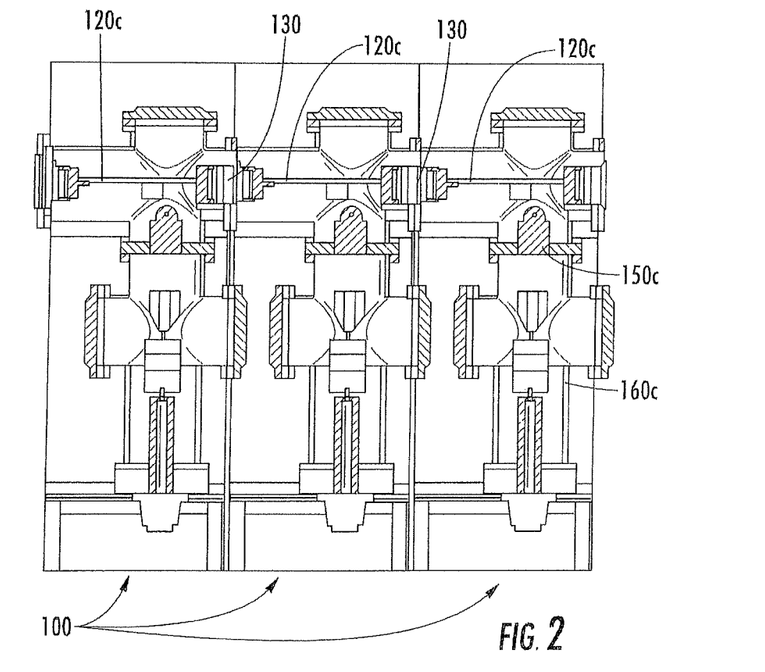
FIG. 2 is a rear view of the switchgear arrangement of FIG. 1.
Figure 3:
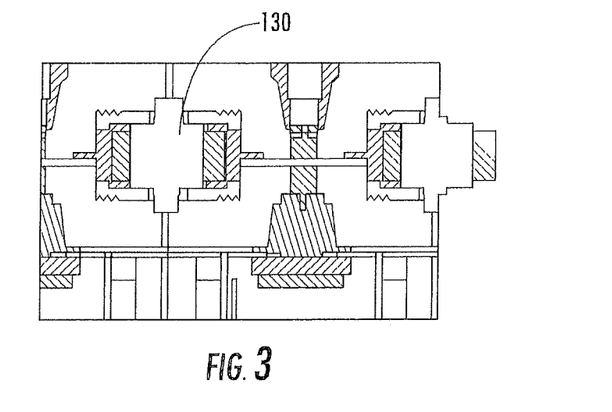
FIG. 3 is a detailed view of bus interconnection of the switchgear arrangement of FIG. 1.
Figure 4:
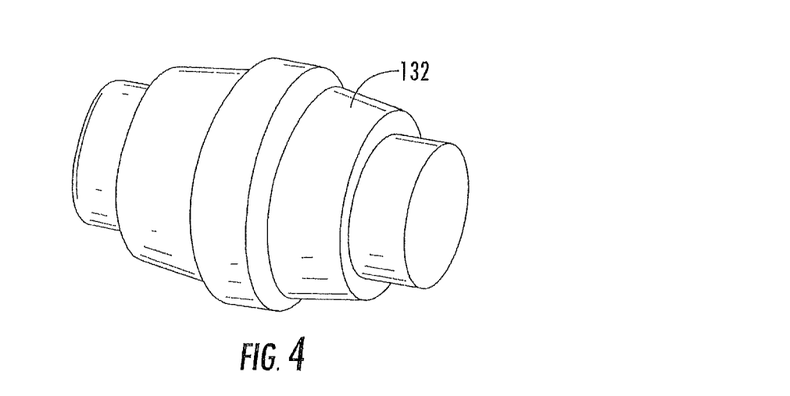
FIG. 4 is a perspective view of a bushing-type connector for the switchgear arrangement of FIG. 1.
Figure 5:
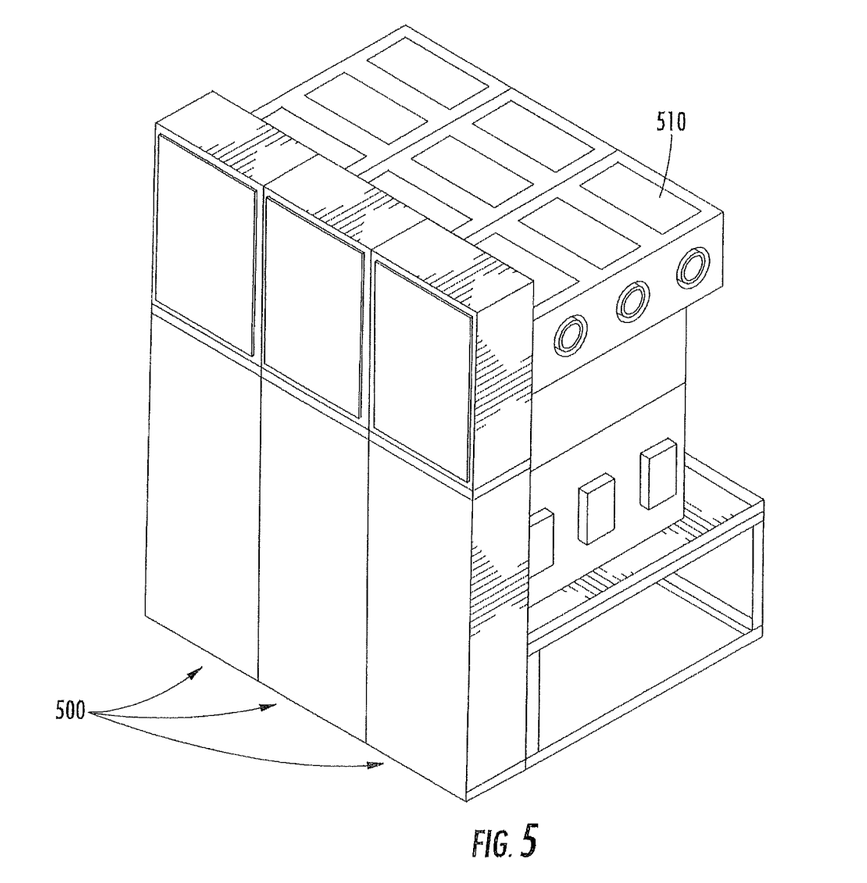
FIG. 5 is a perspective view of a switchgear arrangement according to further embodiments.

FIGS. 1-3 illustrate a switchgear arrangement according to some embodiments. FIG. 1 is a perspective view illustrating three switchgear units (panels) 100 arranged in a row and interconnected by a bus assembly including conductive bus sections (e.g., copper bus bars) that are disposed within gas-filled bus enclosures 110a, 110b, 110c. FIG. 2 is a rear elevation illustrating multiple switchgear units 100 arranged in a row. Respective bus sections 120c of the switchgear units 100 for a given phase (here, phase C) are disposed within respective bus enclosures 110c. The bus enclosures 110c are sealed and configured to contain a dielectric gas (e.g., sulfur hexafluoride or a fluoroketone gas), and may be fabricated from metal (e.g., cast or fabricated from sheet metal) or non-metal materials, such as fiberglass. The bus sections 120c are interconnected using bushing-type interconnections 130 at abutting end faces of the enclosures 110c. The bus interconnections 130 are shown in detail in FIG. 3. Referring to FIG. 4, the bus interconnections 130 may use bushing-type connectors that are interconnected using bus plugs 132, outside of the gas containment enclosures.

Figure 13:
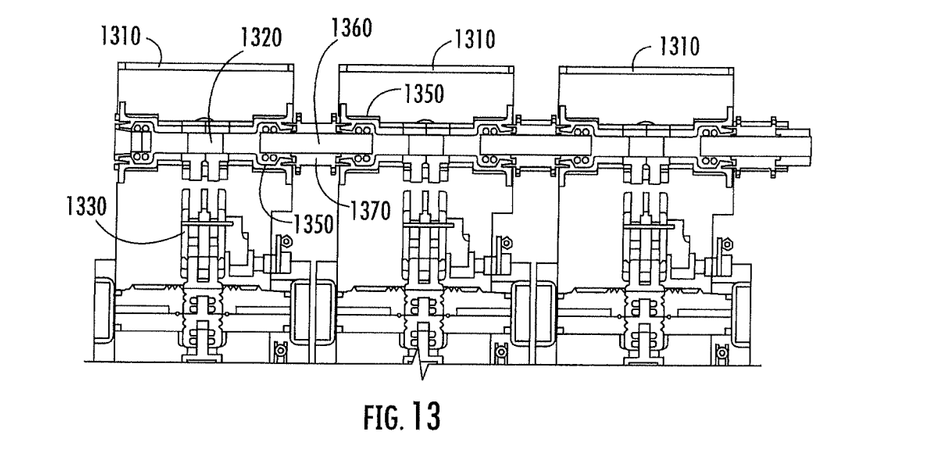
FIG. 13 is a side cross-section of a switchgear arrangement according to further embodiments.
Figure 14:
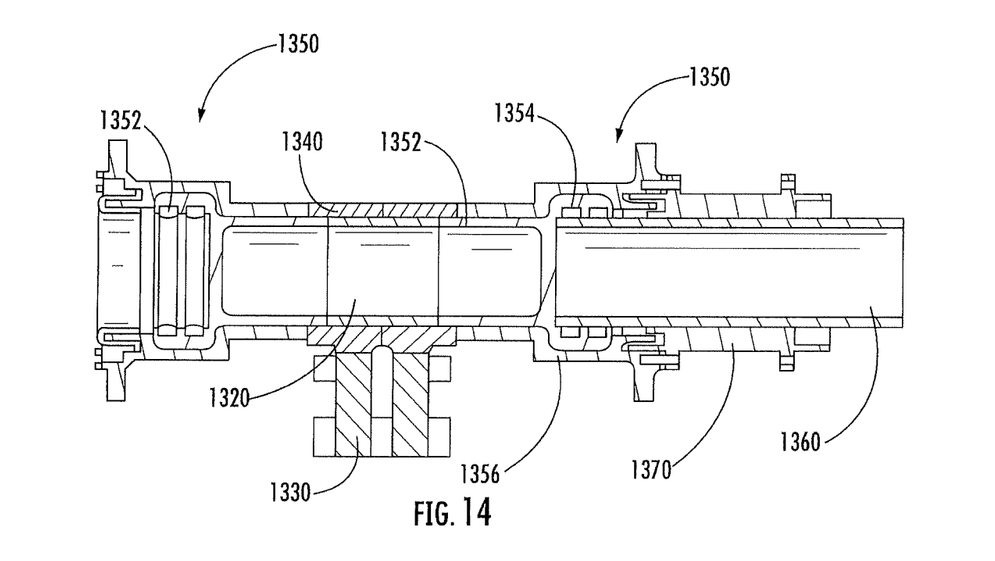
FIGS. 14-18 are detailed views of a connector arrangement and components thereof for the switchgear arrangement of FIG. 13.

FIGS. 13-18 illustrate a different connector arrangement for interconnecting bus sections in gas-containment enclosures according to further embodiments. Referring to FIGS. 13 and 14, bus sections 1320 in respective gas-containment enclosures 1310 are interconnected using connectors 1350 that are linked by tubular conductors 1360 passing between the connectors 1350. Within the enclosures 1310, clamp structures 1340 electrically connect the connectors 1350 and the bus sections 1320 to a switch 1330. Between the enclosures 1310, the tubular conductors 1360 are covered by an insulating sleeve 1370.

Figure 15:
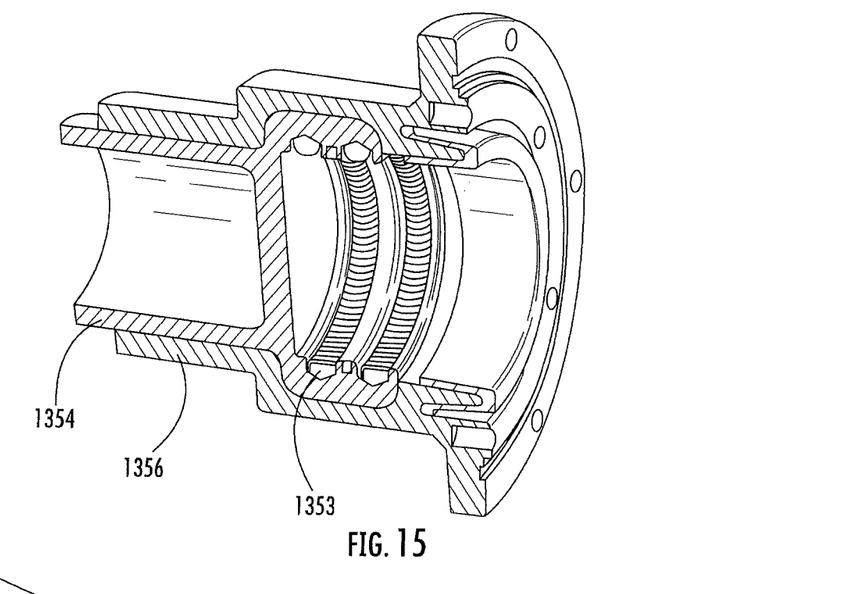
Figure 16:
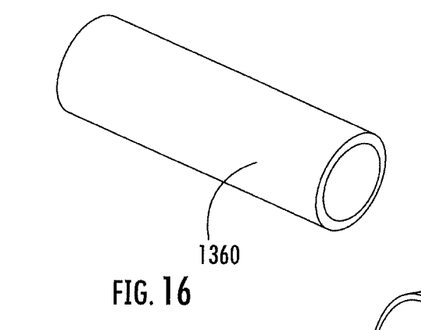
Figure 17:
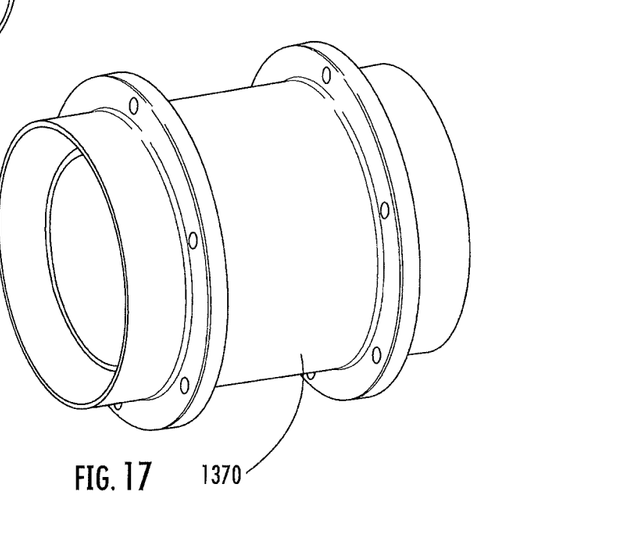
Figure 18:
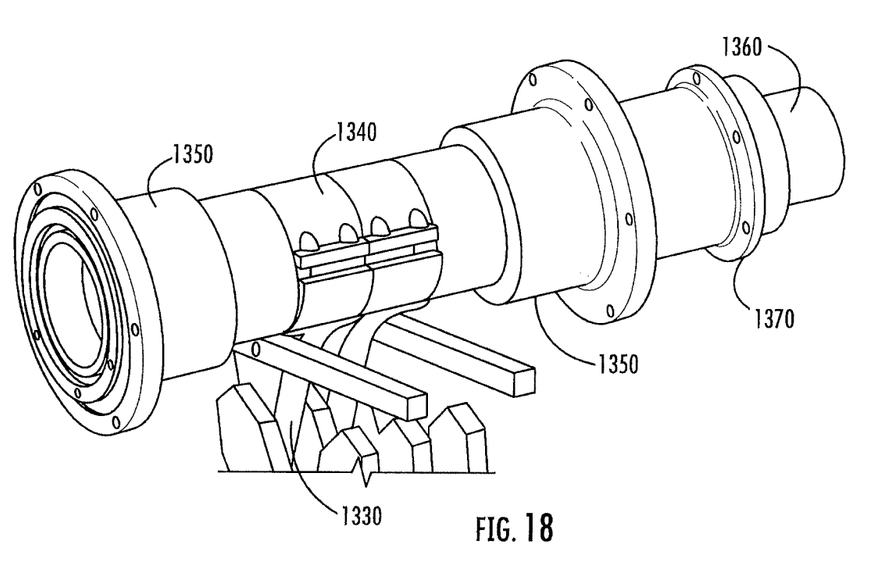

FIGS. 15-17 show components of the connector arrangement in greater detail. Referring to FIGS. 15 and 16, each of the connectors 1350 includes an inner conductor structure 1354 with a spring-type contact assembly 1353 that is configured to receive the tubular conductor 1360. FIG. 17 illustrates the insulating sleeve 1370 used to cover the tubular conductor 1360. FIG. 18 illustrates the clamp structure 1340 used to interconnect the bus sections 1320, the connectors 1350 and the switch 1330.

A potential advantage of the arrangement shown in FIGS. 13-15 is that it may ease removal of selected ones of the units. In particular, the enclosure 1310 of the unit to be replaced may be opened to gain access to the clamp structure 1340 and the connectors 1350. The clamp structure 1340 and connectors 1350 may be disassembled. This can provide access to the tubular conductor 1360 from inside of the opened enclosure 1310, allowing removal of the tubular conductor via the opened enclosure. This allows one of the enclosures 1310 to be removed from between adjacent ones of the enclosures 1310 without requiring removal of the adjacent enclosures 1310.

Referring again to FIG. 2, the bus sections 120a, 120b, 120c may also be connected to gas-insulated disconnect switches 150c and gas-insulated circuit interrupters 160c. It will be appreciated, however, that the arrangement of disconnect switches and circuit interrupters depicted is provided for purposes of illustration, and that other arrangements of switchgear components may be used with bus structures according to embodiments of the invention subject matter.

Figure 6:
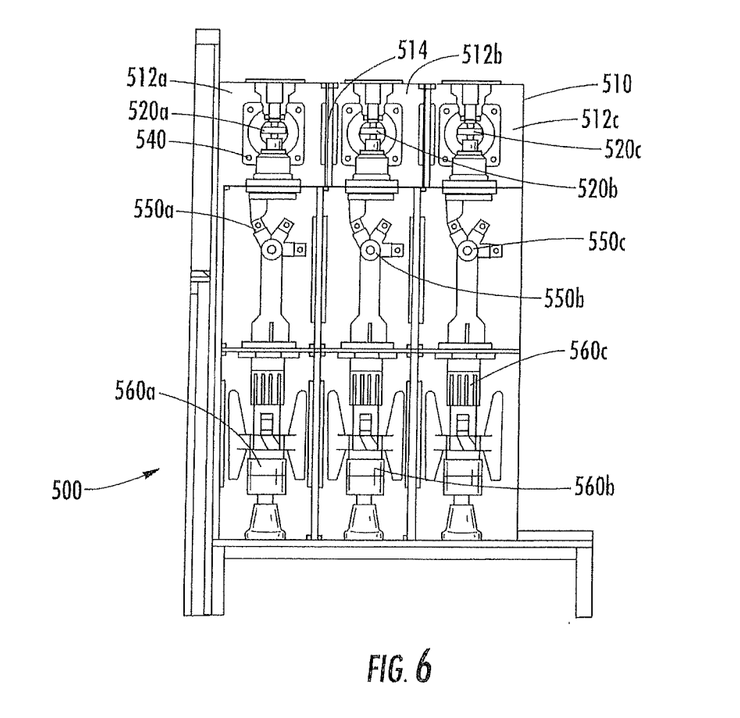
FIG. 6 is a side cross-section of the switchgear arrangement of FIG. 5
Figure 7:
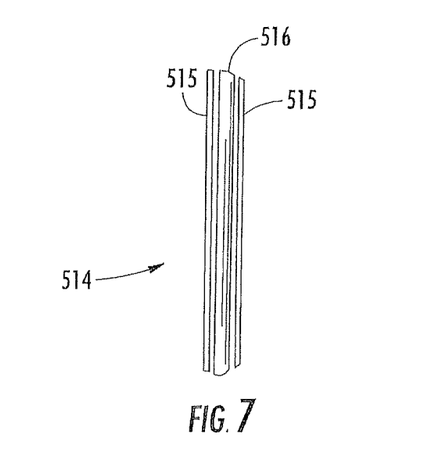
FIG. 7 is a detailed view of a wall between bus compartments sections of the switchgear arrangement of FIG. 5.

FIGS. 5-8 illustrate an alternative arrangement for switchgear units 500 using a multiphase bus enclosure assembly 510 having respective gas-filled compartments therein designed to isolate bus sections for phases from one another. FIG. 6 is a side elevation illustrating the bus enclosure assembly 510 including separate gas-filled compartments 512a, 512b, 512c. Respective bus sections 520a, 520b, 520c are housed within respective ones of the compartments 512a, 512b, 512c. The compartments may be separated by walls 514 that are grounded and/or insulating. Referring to FIG. 7, for example, the walls 514 may have a sandwich construction including outer metal (steel) layers 515 on opposite sides an insulating layer 516, which may be air, a dielectric gas (e.g., $SF_6$) or a solid insulator (e.g., GPO3). Referring to FIG. 6, the bus sections 520a, 520b, 520 may be electrically coupled to respective groups of switchgear components, here shown as including gas-insulated disconnect switches 550a, 550b, 550c and gas-insulated circuit interrupters 560a, 560b, 560c. The bus sections 520a, 520b, 520c may be coupled to these components via bushing-type interconnections 540.

Figure 8:
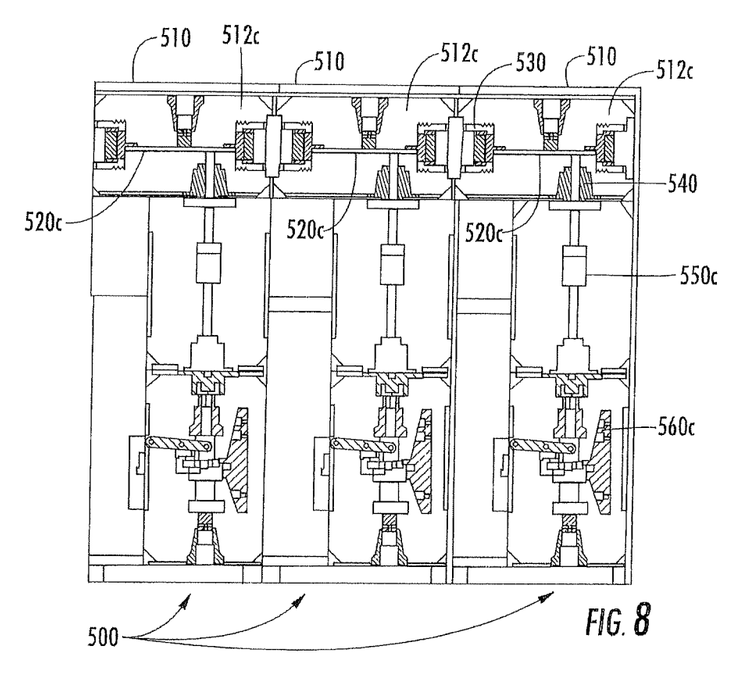
FIG. 8 is a rear cross-section of the switchgear arrangement of FIG. 5.

FIG. 8 is a rear elevation showing interconnections of a row of such switchgear units 500. Bus sections 520c for a given phase are interconnected by bushing-type interconnections 530 at abutting walls of the enclosure assemblies 510 of the switchgear units 500. The bus sections 520c may be connected to the other gas-insulated switchgear components via bushing-type interconnections 540.

Figure 9:
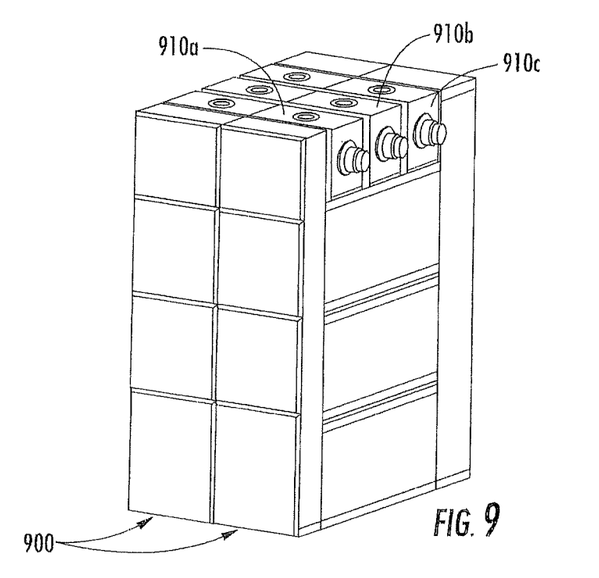
FIG. 9 is a perspective view of a switchgear arrangement according to further embodiments.
Figure 10:
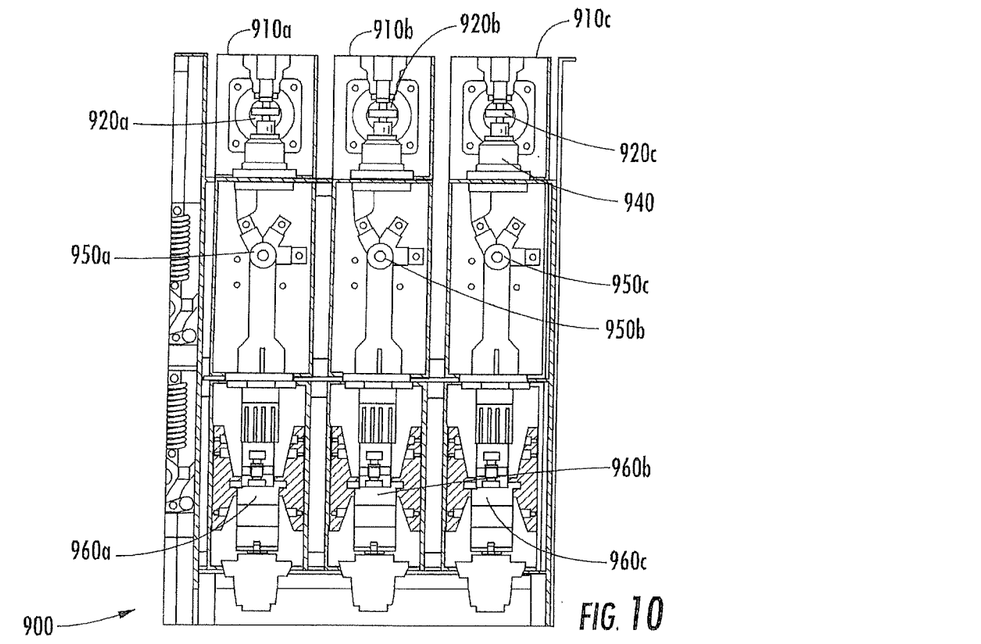
FIG. 10 is a side cross-section of the switchgear arrangement of FIG. 9.
Figure 11:
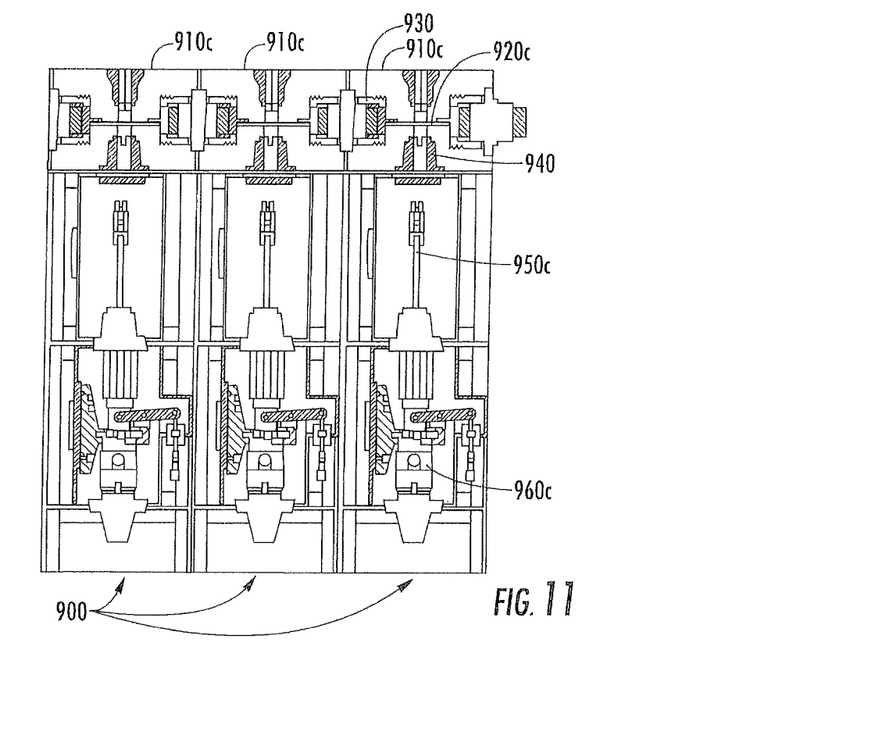
FIG. 11 is a rear cross-section of the switchgear arrangement of FIG. 9.

FIGS. 9-11 illustrate switchgear units 900 using another type of gas-filled bus enclosure arrangement. Referring to the side elevation of FIG. 10, in a given switchgear unit 900, respective gas-filled bus enclosures 910a, 910b, 910c house respective bus sections 920a, 920b, 920c for respective phases. The bus enclosures 910a, 910b, 910b may be sealed units fabricated from sheet metal, for example, and may be separated from one another by air gaps. The bus sections 920a, 920b, 920c may be connected to other gas-insulated switchgear components including disconnect switches 950a, 950b, 950c and circuit interrupters 960a, 960b, 960c via bushing-type interconnections 940. A rear elevation in FIG. 11 shows a row of interconnected switchgear units 900, illustrating that bus sections 920c of the switchgear units for a given phase may be interconnected using bushing-type interconnections 930.

Figure 12:
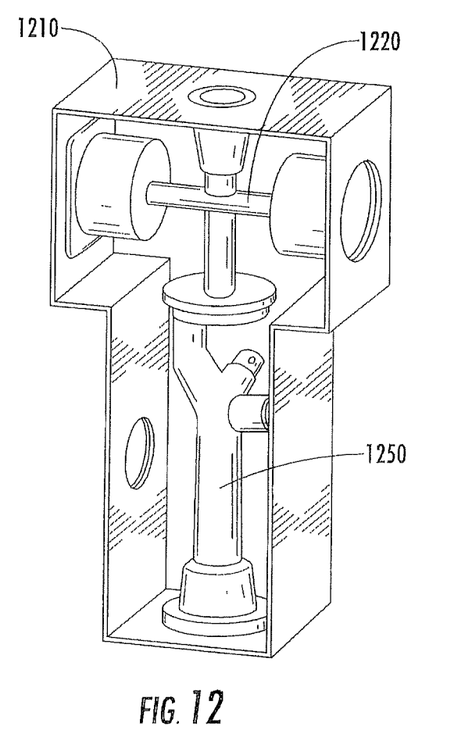
FIG. 12 is a cutaway perspective view of a bus assembly with an integrated switch according to further embodiments.

According to further aspects, gas-filled enclosures for switchgear buses may also contain other switchgear components. For example, FIG. 12 illustrates a gas-filled bus enclosure 1210 that houses a bus section 1220 along with a disconnect switch 1250. It will be appreciated that other or additional switchgear components (e.g., circuit interrupters, sensors, etc.) may also be contained within such an enclosure.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

What is claimed is:

1. A switchgear assembly comprising:
a plurality of switches arranged in a row; and
a plurality of gas insulated bus assemblies arranged in a row parallel to the row of switches, the bus assemblies having gas containment enclosures with respective conductive bus sections therein electrically connected to one another by pairs of mated first connectors, wherein the first connectors of one of the pairs of first connectors connecting a first gas containment enclosure and a second gas containment enclosure are interconnected by a conductor section, wherein the conductor section comprises a tubular conductor section, wherein the one of the first connectors of the one of the pairs of first connectors comprises a contact assembly comprising a circular spring-type contact that receives and surrounds the tubular conductor section, wherein the contact assembly is connected to the conductive bus section in the first gas containment enclosure by a clamp, and wherein the conductor section is accessible from within one of the first gas containment enclosure by releasing the clamp and removing the contact assembly.

2. An apparatus comprising:
first and second gas insulated bus assemblies arranged in a row, the first and second gas insulated bus assemblies having respective first and second gas containment enclosures with respective first and second conductive bus sections therein electrically connected to one another by first and second connectors interconnected by a tubular conductor section that runs between the first and second gas containment enclosures, wherein the first and second connectors each comprise a contact assembly comprising a circular spring-type contact that receives and surrounds the tubular conductor section.

3. The apparatus of claim 2, wherein the contact assembly of the first connector is connected to the first conductive bus section in the first gas containment enclosure by a clamp, and wherein the tubular conductor section is accessible for removal from within the first gas containment enclosure by releasing the clamp and removing the contact assembly of the first connector.

* * * * *